(12) United States Patent
Walsh

(10) Patent No.: US 9,728,329 B2
(45) Date of Patent: Aug. 8, 2017

(54) COIL TECHNIQUES

(75) Inventor: James Walsh, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 848 days.

(21) Appl. No.: 13/977,540

(22) PCT Filed: Sep. 15, 2011

(86) PCT No.: PCT/US2011/051724
§ 371 (c)(1),
(2), (4) Date: Jun. 28, 2013

(87) PCT Pub. No.: WO2013/039500
PCT Pub. Date: Mar. 21, 2013

(65) Prior Publication Data
US 2013/0286583 A1    Oct. 31, 2013

(51) Int. Cl.
| H01F 38/14 | (2006.01) |
| H02J 7/00 | (2006.01) |
| H02J 7/02 | (2016.01) |
| H02J 5/00 | (2016.01) |

(52) U.S. Cl.
CPC .............. *H01F 38/14* (2013.01); *H02J 5/005* (2013.01); *H02J 7/0042* (2013.01); *H02J 7/025* (2013.01)

(58) Field of Classification Search
None
See application file for complete search history.

(56) References Cited

U.S. PATENT DOCUMENTS

| 5,350,413 A | 9/1994 | Miller |
| 6,270,617 B1 | 8/2001 | Yin et al. |
| 2010/0194336 A1 | 8/2010 | Azancot et al. |
| 2010/0253092 A1 | 10/2010 | Lai et al. |
| 2011/0089768 A1* | 4/2011 | Byrne ............ H01F 38/14 307/104 |

FOREIGN PATENT DOCUMENTS

| JP | 58-124214 | 7/1983 |
| JP | H11-307376 | 5/1999 |
| JP | 2007-252090 A | 9/2007 |
| JP | 2010-075018 A | 4/2010 |

(Continued)

OTHER PUBLICATIONS

Office Action for Japanese Patent Application 2014-529666 mailed Jun. 2, 2015. 4 pages. Japanese Office Action, 4 pages English Translation.

(Continued)

*Primary Examiner* — Jared Fureman
*Assistant Examiner* — Aqeel Bukhari
(74) *Attorney, Agent, or Firm* — Eversheds Sutherland (US) LLP

(57) ABSTRACT

Techniques are disclosed involving coils. For example, energy may be transferred between transmitting and receiving coils. The transmitting coil may be in a first device, while the receiving coil may be in a second device. In embodiments, the transmitting coil may be shaped in a way as to direct a magnetic field toward a receiving device. Similarly, the receiving device may be shaped in a way that is directed towards the device having the transmitting coil.

19 Claims, 6 Drawing Sheets

(56) References Cited

FOREIGN PATENT DOCUMENTS

| KR | 10-2007-0099245 A | 10/2007 |
|----|-------------------|---------|
| KR | 10-2011-0077478 A | 7/2011 |
| WO | 2013/039500 A1 | 3/2013 |

OTHER PUBLICATIONS

Translation of First Office Action for Chinese Patent Application No. 201180073476.2 dated Aug. 5, 2015. 17 pages.
Chinese Search Report for Chinese Application No. 201180073476.2 mailed Jul. 25, 2015. 3 pages.
European Search Report and Written Opinion for EP Application No. 11872470.7 mailed Apr. 14, 2015. 6 pages.
Office Action for Japanese Patent Application 2014-529666 mailed Feb. 10, 2015. 4 pages Japanese Office Action, 4 pages English Translation.
International Search Report and Written Opinion received for PCT Application No. PCT/US2011/051724, mailed on May 1, 2012, 9 pages.
Office Action for Chinese Patent Application No. 201180073476.2 mailed Mar. 4, 2016.
European Examination Report for EP Application No. 11872470.7 mailed Jan. 7, 2016, 4 pages.
Office Action from Chinese Application No. 201180073476.2 mailed Sep. 5, 2016. (25 pgs., including 16 pgs. translation).
Office Action from Japanese Application No. 2014-529666 mailed Jul. 19, 2016. (6 pgs., including 3 pgs. translation).
Second Office Action for Japanese Application No. JP2014-529666, mailed Nov. 8, 2016, 6 pages (3 pages English translation).
Office Action for Chinese Application No. 2011/80073476.2, dated Mar. 27, 2017, 23 pages (13 pages English translation).

\* cited by examiner

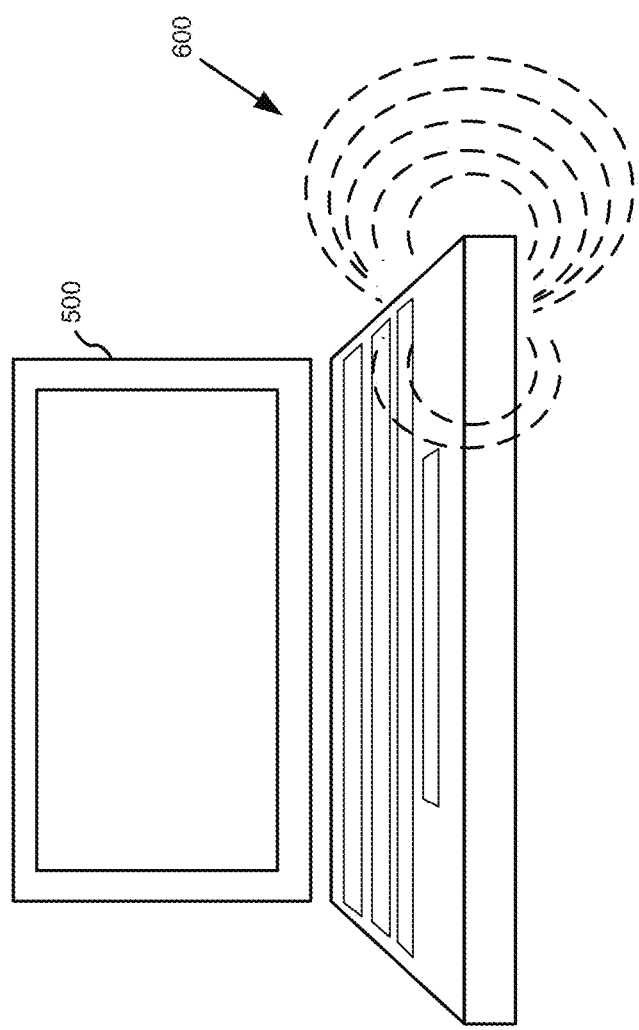

COIL TECHNIQUES

BACKGROUND

Devices within close proximity of each other may wirelessly transfer energy for various reasons. For instance, a device may wirelessly charge another device's battery. Also, two devices may engage in near field communications (NFC).

Such wireless energy transfer may involve an electromagnetic coupling between proximate coils. For example, a first device may have a transmitting coil and a second device may have a receiving coil. When an electrical current flows through the transmitting coil, a magnetic field is generated. In turn, this magnetic field may induce an electrical current in the receiving coil.

Unfortunately, conventional coils are not directional. This may impair the effectiveness of such energy transfer.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIG. 6 is an illustration of an exemplary field pattern; and

DETAILED DESCRIPTION

Figure 1:
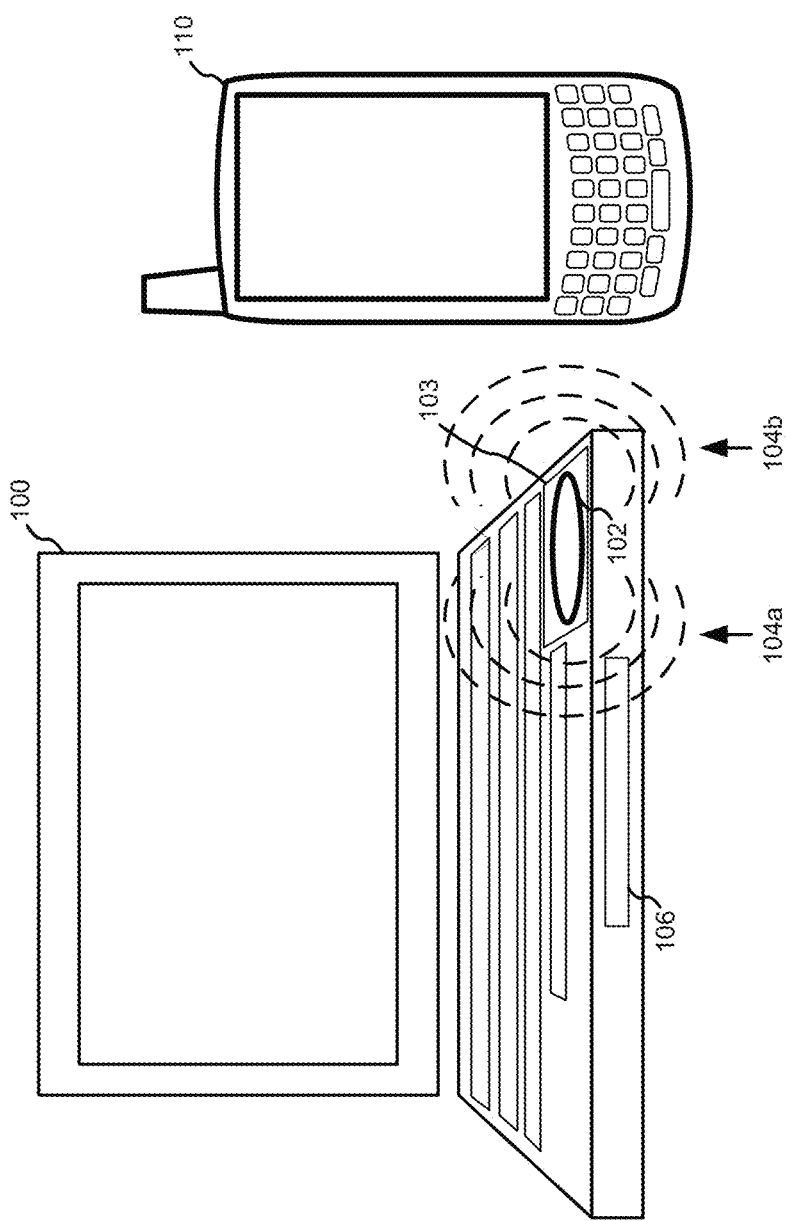
FIG. 1 is a diagram of a conventional coil arrangement.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments provide techniques involving the transfer of energy between transmitting and receiving coils. The transmitting coil may be in a first device, while the receiving coil may be in a second device. In embodiments, the transmitting coil may be shaped in away as to direct a magnetic field toward a receiving device. Similarly, the receiving device may be shaped in a way that is directed towards the device having the transmitting coil.

The transfer of such energy may be in accordance with a wireless charging application. Exemplary wireless charging applications include (but are not limited to) any versions or conventions of Wireless Resonant Energy Link (WREL) (WREL is developed by Intel Corporation of Santa Clara, Calif.), and wireless power techniques, as provided by the Consumer Electronics Association (CEA). However, embodiments may be employed with other wireless charging techniques, standards, and contexts. Additionally or alternatively, the transfer of such energy may provide power to a receiving device for general use (e.g., operational power). Alternatively/additionally, the transfer of such energy may be in accordance with a communications application, such as a near field communication (NFC) application.

These devices may be of various types. For example, the transmitting and receiving devices may each be a computing platform. Exemplary computing platforms include notebook, laptop, and desktop computers. Further, exemplary computing platforms may include portable devices, such as tablets, wireless phones, smartphones, personal digital assistants (PDAs), media players, television devices, wearable computing devices, and so forth. Embodiments are not limited to these examples.

Through the techniques described herein, various advantages may be achieved. For instance, a receiving device may be placed further away from a transmitting device than would otherwise be possible at a given power transfer efficiency.

Also, electro-magnetic interference (EMI) within a computing platform may be advantageously reduced. This is because wireless power transfer applications involve large magnetic fields than can interfere with circuitry within the computing platform. By directing most of a magnetic field away from the computing platform's circuitry, embodiments may substantially reduce the field strength that occurs in and around the computer's circuitry.

Further, embodiments may advantageously reduce interference with wireless power transmission. Such interference may arise from metallic or other magnetic materials within the computing platform. For example, if a computer circuitry printed circuit board (PCB) with a ground or power plane is placed under or over the transmit coil, this PCB plane interferes with wireless power transmission. Embodiments may advantageously reduce or eliminate this issue.

Moreover, embodiments may be more easily integrated into a computing platform. For example, embodiments may consume less space than conventional coil arrangements. Also, embodiments may advantageously impose fewer constraints or requirements regarding the placement of other PCBs or metallic materials within a computing platform.

FIG. 1 is a diagram of a conventional coil arrangement. More particularly, FIG. 1 shows a notebook computing platform 100 having a coil 102 arranged on a surface 103. Coil 102 is shown as a single turn. However, arrangements may include multiple turns. Surface 103 is within an outer housing (or case) of notebook computing platform 100. As shown in FIG. 1, surface 103 is substantially horizontal.

In operation, a time varying electrical current may be circulated through coil 102. This causes a magnetic field to be generated. In turn, a proximate device (also called a receiving device) having its own coil arrangement may (through inductive coupling) generate a corresponding electrical current from this magnetic field. This generated current may be employed to provide power to the receiving device for purposes which include (but are not limited to) charging a battery within the receiving device. For purposes of illustration, FIG. 1 shows a mobile phone 110 as a proximate receiving device. Embodiments, however, are not limited to the transfer of energy between notebooks and mobile phones.

FIG. 1 shows an exemplary magnetic field pattern generated by coil 102. This field pattern is shown having symmetrical left side and right side portions (indicated as 104a and 104b). Several disadvantages are associated with such a pattern. For example, a significant portion of the pattern is directed towards central portions of platform 100, where a receiving device is not likely to be placed. This may unfortunately limit the wireless charging distance that may be achieved with receiving devices.

Also, magnetic field pattern 104 may cause electromagnetic interference (EMI) with circuitry within platform 100. As an illustrative example, FIG. 1 shows a circuitry module 106 within platform 100 that is covered by the left side portion 104a of the magnetic field pattern.

Further, metallic components within platform 100 may interfere with (e.g., shield or attenuate) the magnetic field generated by coil 102. Examples of such metallic components may include (but are not limited to) a ground or power plane near (e.g., over or underneath) coil 102, as well as metallic components within circuitry module 106.

Embodiments employ techniques that may overcome the aforementioned disadvantages. For instance, embodiments may include an asymmetric coil. Such a coil may be employed as a transmit coil or a receiving coil. The coil may be used in accordance with a wireless charging applications. However, embodiments are not limited to such applications. Examples of such coils are provided in FIGS. 2 and 3.

Figure 2:
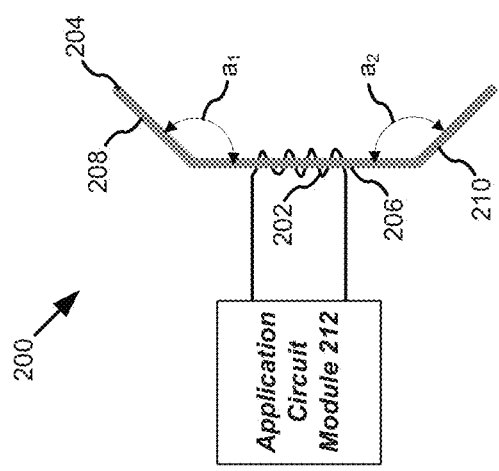

For instance, FIG. 2 is a diagram of an exemplary coil apparatus 200 that may be employed in embodiments. Coil apparatus 200 includes a conductive pattern 202 having a plurality of turns. Pattern 202 is composed of an electrically conductive material (e.g., a metallic wire). Also, coil apparatus 200 includes a core 204 that passes through the plurality of turns. Core 204 includes a central segment 206, a first end segment 208, and a second end segment 210. As shown in FIG. 2, first end segment 208 is at an angle $a_1$ with central segment 206, while second end segment 210 is at an angle $a_2$ with central segment 206. In embodiments, core 204 is composed of an electrically conductive and/or magnetically conductive (magnetic) material.

Figure 3:
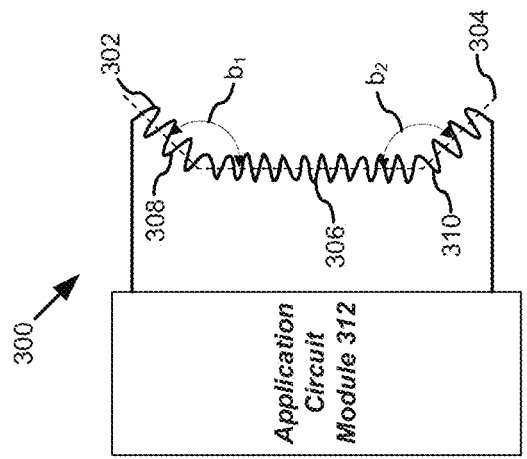
FIGS. 2 and 3 are views of exemplary coil apparatuses.

FIG. 3 is a diagram of an exemplary coil apparatus 300 that may be employed in embodiments. Coil apparatus 300 includes a conductive pattern 302 having a plurality of turns. Pattern 302 is composed of an electrically conductive material (e.g., a metallic wire). These turns are arranged along a path 304. As shown in FIG. 3, path 304 includes a central segment 306, a first end segment 308, and a second end segment 310. First end segment 308 is at an angle $b_1$ with central segment 306, while second end segment 310 is at an angle $b_2$ with central segment 306. In embodiments, core 204 is composed of an electrically conductive and/or magnetically conductive (magnetic) material.

Coil apparatuses 200 and 300 are asymmetrical. For instance, FIGS. 2 and 3 show that each of coil apparatuses 200 and 300 has a rightward facing concavity. In embodiments, such concavities may be in one or more dimensions (e.g., x, y, z dimensions).

In embodiments, coils may be coupled to components that generate receive and/or process signals corresponding to energy transferred between coils. As examples, FIGS. 2 and 3 further shows that coil apparatuses 200 and 300 may be coupled to application circuit modules 212 and 312, respectively. These modules produce or receive electrical currents that circulate in the coupled coil apparatus (i.e., coil apparatus 200 or 300). These electrical currents may be associated with applications (e.g., wireless charging power transfer, and/or NFC applications).

For example, when a coil apparatus operates as a transmitting coil, the coupled application circuit module generates a current that is circulated through the coil apparatus. This current generates a flux that is intended to induce a corresponding electrical current in a remote receiving coil. Thus, application circuit modules 212 and 312 may each include components, such as signal generation circuitry, and/or data transmission circuitry (e.g. modulators, amplifiers, etc). Embodiments, however, are not limited to these examples.

Alternatively, when a coil apparatus operates as a receiving coil the coupled application circuit module receives a current from the coil apparatus (i.e., coil apparatus 200 or 300) that is based on a coupling with a remote transmitting coil. In turn, the application circuit module may processes this current. Thus, application circuit modules 212 and 312 may each include components, such as battery charging circuitry, power distribution circuitry (e.g., for general power (e.g., operational power) transfer applications) and/or data signal reception circuitry. Embodiments, however, are not limited to these examples.

As described above, coils may include one or more turns. Such turns may have various shapes, widths, and/or depths. Likewise, any corresponding core may have various shapes, widths, and/or depths Examples of such features are shown in the axial cross-sectional views of FIGS. 4A-4D.

Figure 4B:
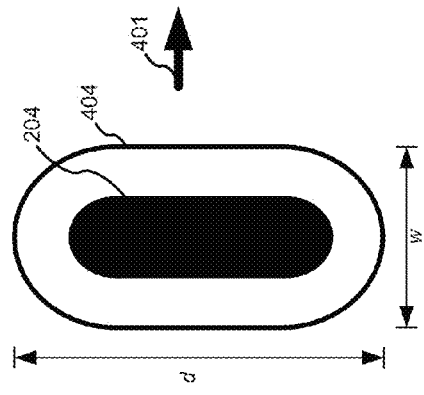
FIGS. 4A-4D are views of exemplary turns and cores.
Figure 4D:
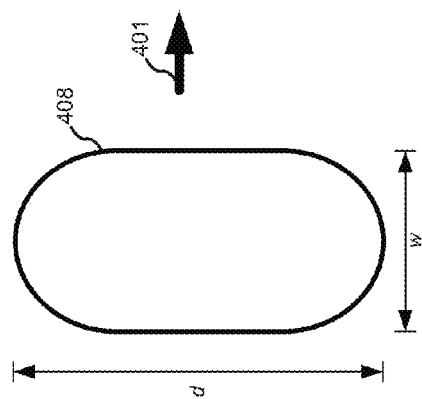
Figure 4A:
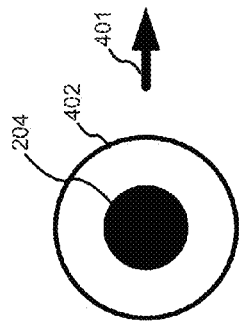

For instance, FIG. 4A provides a view of an exemplary turn 402 that may be included in conductive pattern 202 of coil apparatus 200. In particular, FIG. 4A shows that turn 402 has a substantially circular shape. Similarly, FIG. 4A shows that core 204 is substantially circular in cross-section. Embodiments, however, are not limited to corresponding cores and turns having similar shapes.

FIG. 4B provides a view of an alternative turn 404 that may be included in conductive pattern 202 of coil apparatus 200. This turn is not circular. More particularly, FIG. 4B shows turn 404 having a depth, d that differs substantially from its width w. Similarly, core 204 has a shape similar to that of turn 404. Embodiments, however, are not limited to corresponding cores and turns having similar shapes.

Figure 4C:
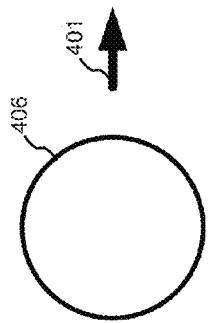

FIG. 4C provides a view of an exemplary turn 406 that may be included in conductive pattern 302 of coil apparatus 300. Turn 406 has the same shape as turn 402 of FIG. 4A.

FIG. 4D provides a view of an alternative turn 408 that may be included in conductive pattern 302 of coil apparatus 300. Turn 408 has the same shape as turn 404 of FIG. 4B.

As shown in FIGS. 4B and 4D, an increased depth may be employed. This may advantageously increase the alignment tolerance which may exist with a proximate coil, while maintaining acceptable energy transfer characteristics.

In each of FIGS. 4A-4D, an arrow 401 indicates a direction in which the corresponding coil's concavity faces. The views of FIGS. 4A-4D are provided for purposes of illustration, and not limitation. Thus, other shapes, widths, and/or depths may be employed for coils and cores.

Coils implemented according to the techniques described herein may be included in various devices. FIGS. 5A-5D provide exemplary arrangements of a notebook computing platform 500 in which the coils of FIGS. 2 and 3 are employed.

Figure 5A:
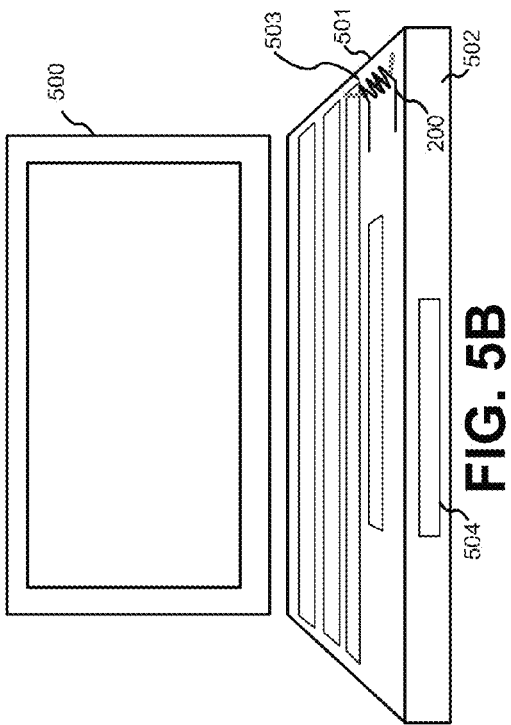
FIGS. 5A-5D are exemplary notebook computing platform arrangements.

For instance, FIG. 5A shows notebook computing platform 500 employing coil apparatus 200. As shown in FIG. 5A, a concavity of coil apparatus 200 is facing towards an outer surface 501 of platform 500. This surface is proximate (e.g., the closest) to coil apparatus 200. Also, in the arrangement of FIG. 5A, coil apparatus 200 is substantially in a plane that is parallel to a surface 502 of computing platform 500.

Figure 5B:
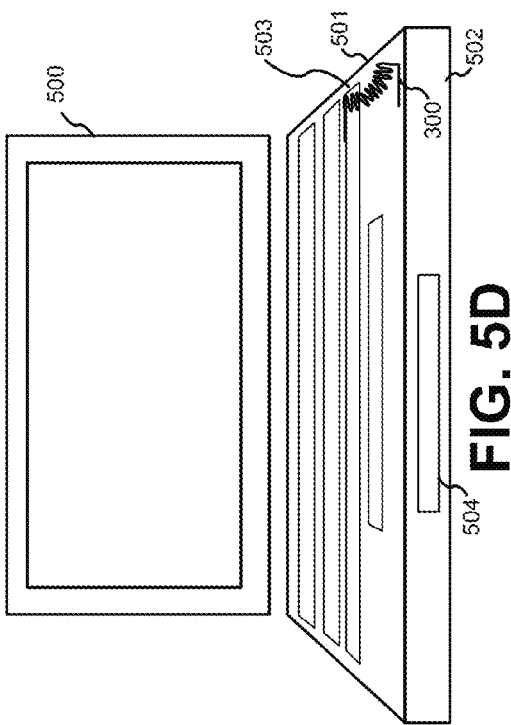

FIG. 5B shows notebook computing platform 500 employing coil apparatus 200 in an orientation that is different from the orientation of FIG. 5A. More particularly in FIG. 5B coil apparatus 200 is substantially in a plane that is parallel to a surface 503 of computing platform 500.

Figure 5C:
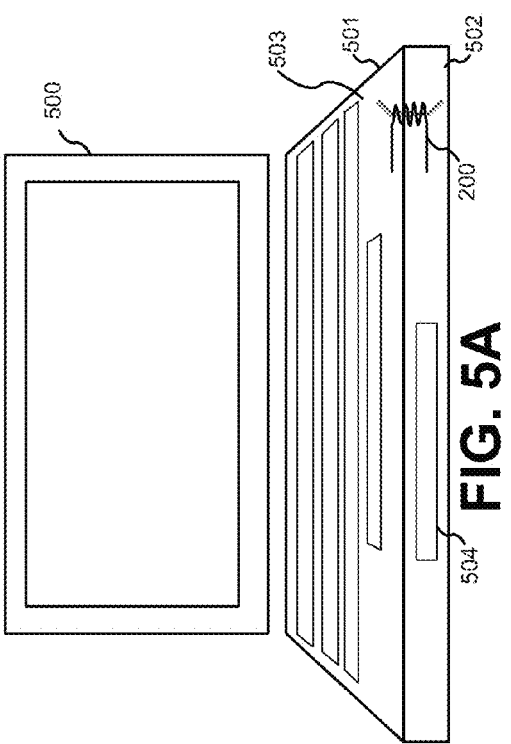
Figure 5D:
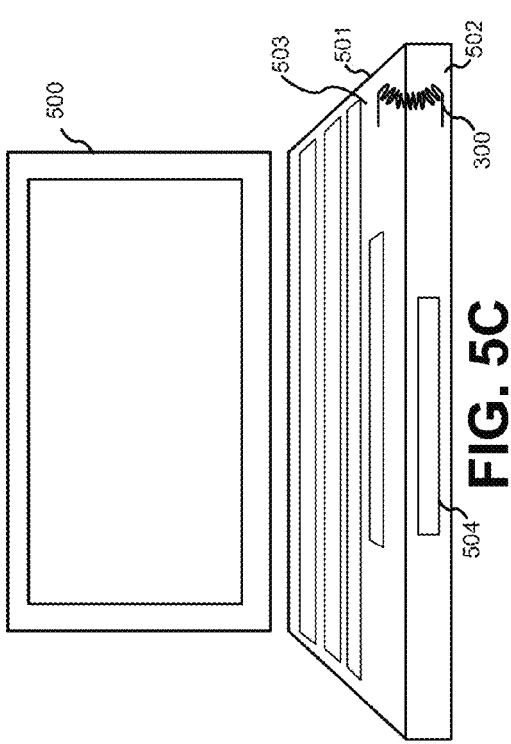

FIGS. 5C and 5D show arrangements in which notebook computing platform 500 employs coil apparatus 300. In each of these arrangements, a concavity of coil apparatus 300 is facing towards outer surface 501, which is proximate (e.g. the closest) to coil apparatus 300. In FIG. 5C, coil apparatus 300 is substantially in a plane that is parallel to surface 502. However, in FIG. 5D, coil apparatus 300 is substantially in a plane that is parallel to surface 503.

FIGS. 5A-5D further show that notebook computing platform 500 includes a circuit component 504. Circuit component may include various circuits and/or electronic components associated with the operation of platform 500. Exemplary circuits/components include processors, memory, device drivers, interface circuitry, disk drives, wireless transceivers, and so forth. Such circuits/components may be implemented on one or more PCBs having ground planes and/or power planes. As shown in FIGS. 5A-5D, coil apparatuses 200 and 300 are arranged so that they are directed away from circuit component 504. This advantageously reduces interference between the coils and circuit component 504.

The arrangements of FIGS. 5A-5D provide for magnetic field patterns in which the components directed away from device 500 are advantageously increased. An illustrative example of this is shown through outward field portion 600 of FIG. 6. It is worthy to note that FIG. 6 is provided for purposes of illustration and not limitation.

Although not shown in FIGS. 5A-5D, coil apparatuses 200 and 300 are coupled to elements (e.g. circuitry) within computing platform 500. Such circuitry is associated with application(s) involving the transfer of wireless energy. Examples of such applications include (but are not limited to) as wireless charging, power transfer, and/or NFC applications. Details regarding examples of such elements are described with reference to FIG. 7

Figure 7:
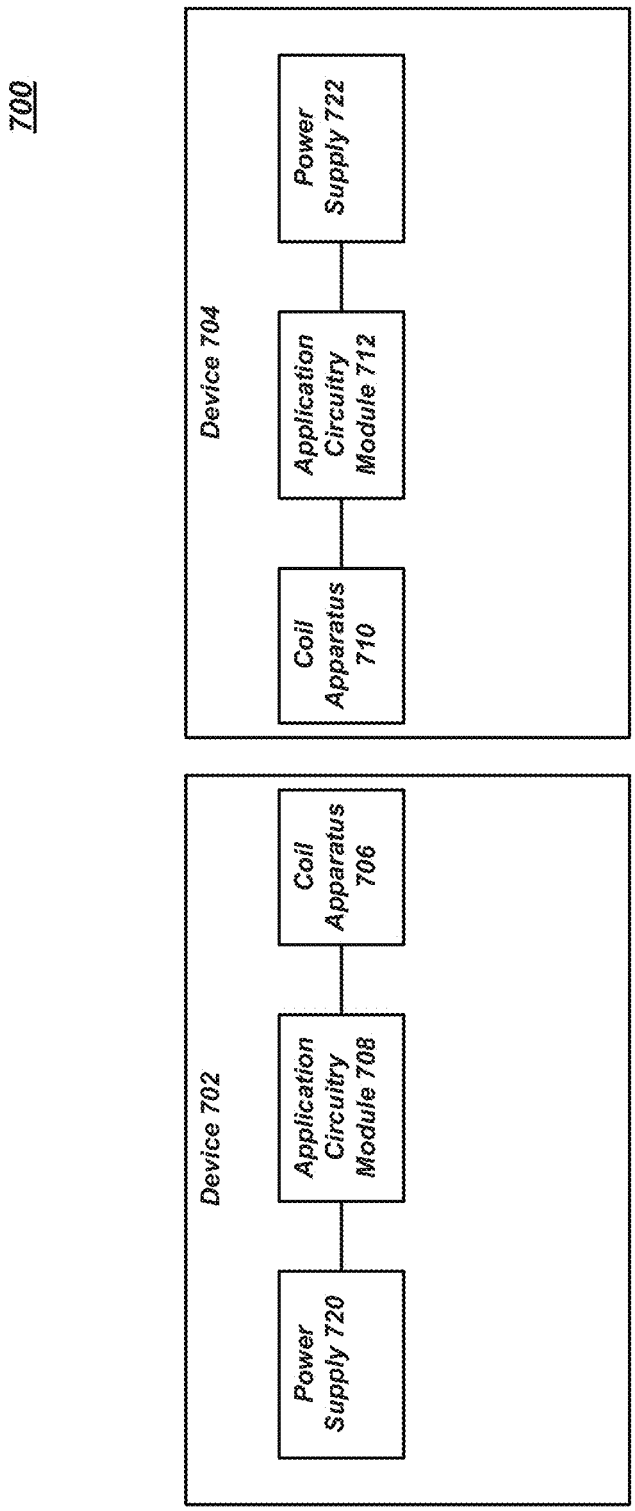
FIG. 7 is a diagram of an exemplary operational environment.

In particular, FIG. 7 is a diagram of an exemplary operational environment 700 in which the techniques described herein may be employed. This environment includes a first device 702 and a second device 704. These devices include various elements that may be implemented in any combination of hardware and/or software.

As shown in FIG. 7, each of devices 702 and 704 includes a coil apparatus and an application circuit module. More particularly, device 702 includes a coil apparatus 706 and an application circuit module 708, while device 704 includes a coil apparatus 710 and an application circuit module 712. Through these elements, devices 702 and 704 exchange wireless energy in accordance with one or more applications (e.g. wireless charging, power transfer, and/or NFC applications).

In embodiments, one of coil apparatuses 706 and 710 operates as a transmitting coil while the other operates as a receiving coil. Also, the transmitting coil and/or the receiving coil may be implemented in accordance with the techniques described herein. For instance, one or both of these coil apparatuses may be implemented to direct and/or receive magnetic fields in directions predominantly away from their corresponding devices (instead of in directions directed within their corresponding devices).

Application circuit modules 708 and 712 generate receive and/or process signals corresponding to energy transferred between coil apparatuses 706 and 710. These elements may be implemented as described above with reference to FIGS. 2 and 3.

Also, FIG. 7 shows that devices 702 and 704 may include power supplies 720 and 722, respectively. Such power supplies may include a battery. For example, in wireless charging applications, such a battery may be charged with energy exchanged between coil apparatuses 706 and 710.

Also, although not shown, devices 702 and 704 may each include processor(s) and storage media (e.g., memory, magnetic, storage, optical storage, etc.). Such elements may be employed to provide various user applications. For instance, the storage media may store instructions (e.g., control logic or software) that causes the processors to execute such applications. Further, the storage media may store data that is handled by such applications. Such user applications may involve information exchanged through coil apparatuses 706 and 710 (e.g. through NFC applications). Accordingly, the processors may each be operatively coupled to a corresponding one of modules 708 and 712.

Further, such user applications may involve the exchange of information with users. Accordingly, devices 702 and 704 may include various user input and output devices. Examples of such devices include (but are not limited to) keypads, keyboards, touch screens, microphones, speakers, displays, etc.

Devices 702 and 704 may be of various types. For example, devices 702 and 704 may be any combination of a notebook computer, desktop computer, tablet computer, personal digital assistant (PDA), mobile phone, smartphone, media player, and so forth. In exemplary wireless charging and/or power (e.g., operational power) transfer scenarios, the larger device may transmit energy to the smaller, device (e.g., a notebook may wirelessly charge a mobile phone or smartphone). Such a scenario is provided for purposes of illustration and not limitation. Thus, a smaller device may wirelessly charge a larger device.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. An apparatus, comprising:
  a housing having a first surface and a second surface substantially normal to the first surface;
  a module to generate an electrical signal; and
  an asymmetric coil to generate a magnetic field based on the electrical signal, the asymmetric coil coupled to the module and placed on the first surface, the asymmetric coil having
  a plurality of turns arranged along a path that has a concavity directed towards the second surface, wherein the concavity of the asymmetric coil directs the magnetic field generated by the coil away from the apparatus.

2. The apparatus of claim 1, further comprising a core comprising a magnetic conductive material, wherein the core is surrounded by the plurality of turns.

3. The apparatus of claim 1, wherein the path has a central segment a first end segment at a first angle to the central segment, and a second end segment at a second angle to the central segment.

4. The apparatus of claim 1, wherein each of the plurality of turns has a non-circular shape.

5. The apparatus of claim 1, wherein each of the turns has a depth substantially perpendicular to the concavity and a width substantially parallel to the concavity, wherein the depth is greater than the width.

6. The apparatus of claim 1, further comprising one or more circuit components, wherein the concavity is directed away from the one or more circuit components.

7. The apparatus of claim 6, wherein the one or more circuit components comprises a printed circuit board (PCB), the PCB having at least one of a ground plane or a power plane.

8. The apparatus of claim 1, wherein the electrical signal is associated with a wireless charging application.

9. The apparatus of claim 1, wherein the asymmetric coil is to wirelessly provide power to a receiving device.

10. The apparatus of claim 1, wherein the apparatus is a notebook computer.

11. An apparatus, comprising:
  a housing having a first surface and a second surface substantially normal to the first surface;
  an asymmetric coil to receive a magnetic field from a remote device, and to generate an electrical signal based on the magnetic field; and
  a module coupled to the asymmetric coil to receive the electrical signal;
  the asymmetric coil placed on the first surface and having a plurality of turns arranged along a path that has a concavity directed towards the second surface of the apparatus.

12. The apparatus of claim 11, the asymmetric coil further comprising a core composed of a magnetically conductive material, wherein the core is surrounded by the plurality of turns.

13. The apparatus of claim 11, wherein the path has a central segment, a first end segment at a first angle to the central segment, and a second end segment at a second angle to the central segment.

14. An apparatus, comprising:
  a housing having a first surface and a second surface substantially normal to the first surface;
  an asymmetric coil placed on the first surface and having a concavity directed towards the second surface, the coil to exchange energy wirelessly with a remote device; and
  one or more circuit components, wherein the concavity is directed away from the one or more circuit components.

15. The apparatus of claim 14, further comprising a module to generate an electrical signal, wherein the asymmetric coil is to generate a magnetic field based on the electrical signal.

16. The apparatus of claim 14, wherein the asymmetric coil has a plurality of turns arranged along a path.

17. The apparatus of claim 16, the asymmetric coil further comprising a core composed of a magnetically conductive material, wherein the core is surrounded by the plurality of turns.

18. The apparatus of claim 14, wherein the asymmetric coil is to receive the wireless energy from the remote device.

19. The apparatus of claim 14, wherein the coil is to send the wireless energy to the remote device.

* * * * *